(No Model.)
A. H. CHILTON.
HORSE DETACHER AND BRAKE.
No. 456,613.   Patented July 28, 1891.
2 Sheets—Sheet 1.
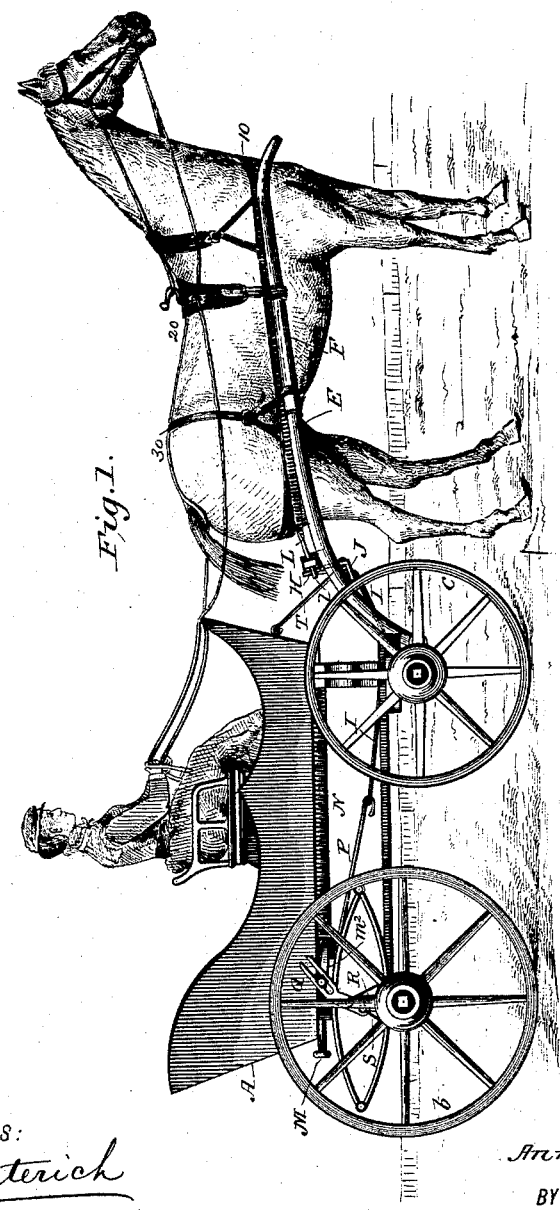
WITNESSES:
Fred G. Dieterich
M. D. Blondel
INVENTOR:
Annie H. Chilton
BY Munn & Co
ATTORNEYS (No Model.) 2 Sheets—Sheet 2.
A. H. CHILTON.
HORSE DETACHER AND BRAKE.
No. 456,613. Patented July 28, 1891.
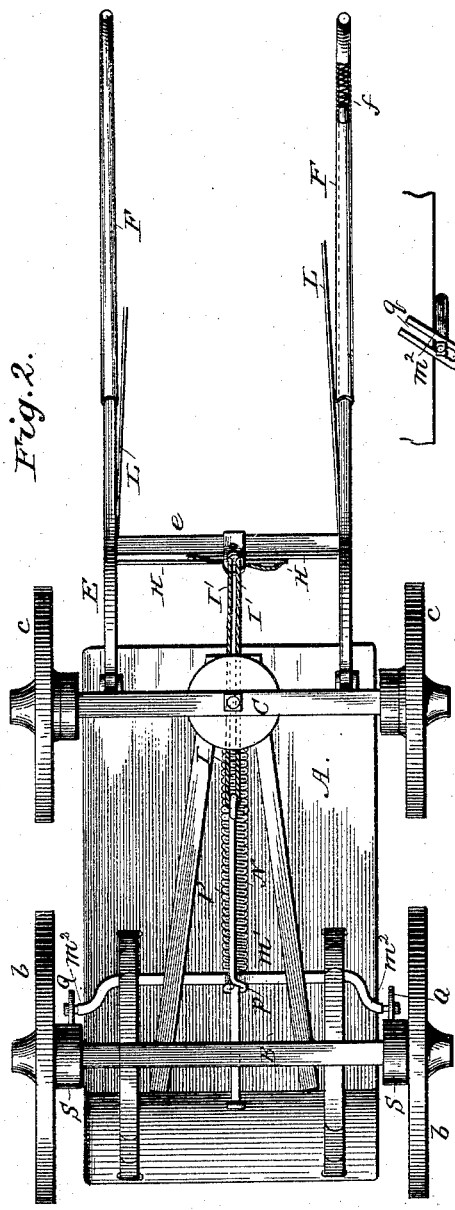
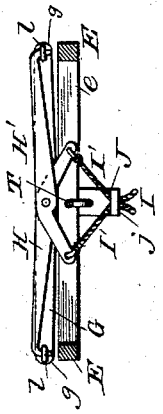
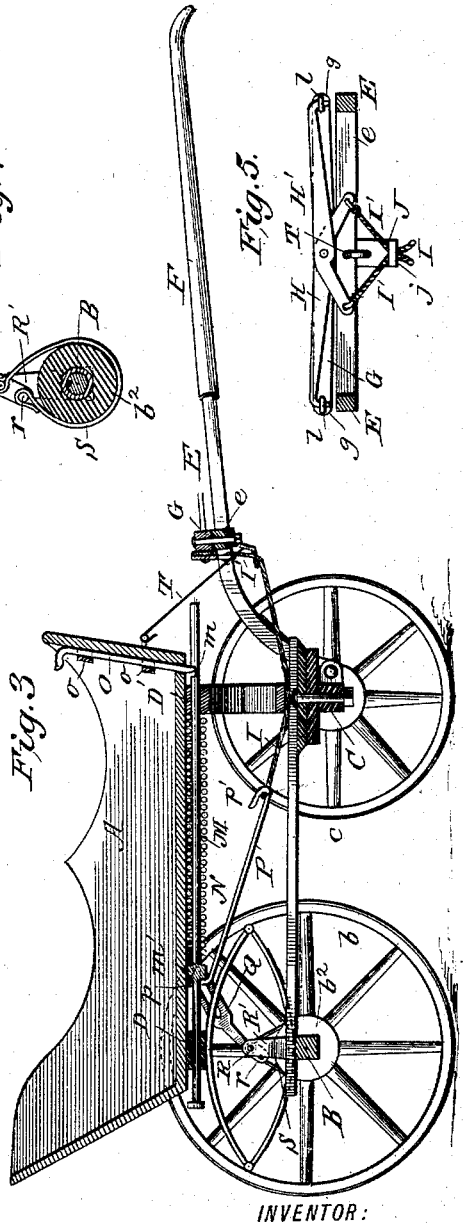
WITNESSES:
Fred G. Dieterich
M. D. Blondel
INVENTOR:
Annie H. Chilton
BY Munn & Co
ATTORNEYS

UNITED STATES PATENT OFFICE.

ANNIE H. CHILTON, OF BALTIMORE, MARYLAND.

HORSE-DETACHER AND BRAKE.

SPECIFICATION forming part of Letters Patent No. 456,613, dated July 28, 1891.

Application filed October 15, 1890. Serial No. 368,226. (No model.)

*To all whom it may concern:*

Be it known that I, ANNIE H. CHILTON, residing in the city of Baltimore, in the State of Maryland, have invented certain new and useful Improvements in a Combined Horse-Detacher and Vehicle-Brake, of which the following is a specification.

My invention has for its object to provide simple and effective means whereby the horse can be detached from the vehicle, the shafts held up from the ground, and the vehicle braked at the same time the animal is released, thus entirely avoiding the danger of vehicles turning over or the shafts being broken after the animal has been released.

My invention consists in the peculiar combination and novel arrangement of parts, all of which will hereinafter be fully described in the annexed specification, and particularly pointed out in the claims, reference being had to the accompanying drawings, in which—

Figure 1 is a view of my improvements as applied for use. Fig. 2 is an inverted plan view of a vehicle with my improvements applied. Fig. 3 is a longitudinal section thereof, and Figs. 4 and 5 are detail views hereinafter referred to.

In the accompanying drawings, A indicates a vehicle; C, the front and B the rear axle, and $b$ $c$ the wheels mounted thereon, said parts being of the ordinary construction.

R' R' indicate upwardly-projecting standards secured to or cast integral with the rear axle, said standards being arranged adjacent the inner faces of the hubs $b^2$ of the rear wheels, as clearly shown in Fig. 4 of the drawings, by reference to which it will be seen that upon studs R, projected outwardly from said standards, are pivoted brake-levers Q, the lower ends of which are extended and provided with outwardly-projecting studs $r$, to which are connected one of the ends of the brake-bands S, which pass about the hubs $b^2$, the opposite ends of such bands being fastened to the upper or pivot studs R, as shown. The upper ends of the levers Q are forked, as at $q$, in which ends the outer ends $m^2$ of a cross-bar $m'$ fit, said cross-bar being disposed just below the vehicle-body and secured to a longitudinal rod M, held to slide in apertures formed in the cross-plates D D', secured to the under side of the body, as shown, and to normally force said slide-rod M rearward. A coiled spring N is disposed about the same intermediate the front cross-plate D' and the cross-bar $m'$. The rear end of the bar M extends back of the vehicle-body and is provided with a suitable hand-hold, while the forward end is formed with a lock-notch $m$, with which the lock-catch O is arranged to engage, said catch consisting of a plate held to slide vertically between guide-brackets $o$, secured to the inner side of the front or dash-board of the vehicle and arranged to be within easy reach of the driver. By reference to Fig. 3 of the drawings it will be observed that when the bar M is pushed forward in a locked position the lower end of the catch O will be in engagement with the lock-notch $m$. When in this position, the bar M will have drawn the cross-bar $m'$ forward, which, in turn, will pull the levers Q to the position shown in Fig. 4, serving to spread the brake-band S and release the wheels B.

E indicates the shafts, clipped to the front axle in the usual manner, upon the cross-bar $e$ of which is pivotally held the singletree G, the ends of which are apertured, as at $g$ $g$, through which the rear ends $l$ of the traces L are passed, said ends being held locked to the whiffletree by means of pivoted locking-arms H, the construction of which is most clearly shown in Fig. 5 of the drawings, by reference to which it will be seen that said arms H are centrally pivoted to the rear face of the singletree G, such arms being projected in opposite directions and formed at their outer ends with depending fingers, which pass through the apertured ends $l$ of the traces, the rear shortened ends of such arms being connected to the ends I' I' of a cord or chain I, which passes through the apertured end $j$ of a guide J, secured to the lower face of the cross-bar $e$, said cord I being passed over the front axle, as shown, and connected to the lower hooked end $p'$ of a pull-rod P, the upper end $p$ of which encircles the rod M just to the rear of the cross-bar $m$.

T indicates a rod detachably secured at its upper end to the front of the dash, its lower end being secured to the bracket J, said rod serving to hold the shafts elevated for a purpose presently explained.

Upon the outer ends of the shafts are detachably held cuff-like sections F, to which the breast-strap 10, back-band 20, and the breeching 30 are connected in a manner clearly shown in Fig. 1 of the drawings, by reference to which it will be observed that all of the harness except the traces is connected to said sections F. To normally force said sections outward and to hold the traces from slack, I provide the extreme ends of such sections with springs $f$, which bear against the outer ends of the shafts, as shown in Fig. 2 of the drawings.

From the foregoing description, taken in connection with the drawings, the operation and advantages of my improvements will be readily understood.

It will be seen that, in case it is necessary to allow the horse to become detached from the vehicle, by raising the catch O the rod M will be forced back, carrying with it the cross-bar, which in turn causes the forked lever Q to swing rearward, draw the band S tightly about the hubs $b^2$, and thereby braking the wheels B. As the cross-bar M' is forced backward, it will draw the pull-rod P back, which pulling on the cord or chain I draws the rear ends of the arms H down and forces the longer ends from engagement with the apertured ends of the traces, and as such ends are released the horse will pull from between the shafts, carrying all the harness and the sections F with him, the rod T serving to hold the shafts elevated, and the brake having been already applied the vehicle will quickly come to a stop without the slightest danger of turning over and becoming demolished.

It will be understood that instead of making the cuff-like sections F continuous, as shown, they may be made into a skeleton-like frame formed with several cuff-bands adapted to slide on the shafts. It will also be understood that while I have shown and described my improved detaching devices as applicable for a single horse they may be readily applied for use in connection with a double team.

Having thus described my invention, what I claim, and desire to secure by Letters Patent, is—

1. The combination, with a horse-detaching device, of a spring-actuated brake connected with the detaching device for operating it simultaneously with the application of the brake, substantially as described.

2. The combination of the vehicle, horse-detaching devices connected therewith, spring-actuated brake appliances, connections between said detaching and brake devices, and a locking device for holding the brakes released and the detaching devices to the vehicle, said devices adapted to simultaneously brake the vehicle and release the horse when disconnected from the lock, substantially as and for the purpose described.

3. The combination, with the shafts E, of the cuff-like sections F, arranged to slip on the ends of the shafts, the traces L, connected to said sections F, the singletree G, the locking-arms H, secured thereto and adapted to hold the traces in place, a spring-actuated locking device, and connections between said device and the arms H, whereby when the locking device is operated for releasing the cuff-like sections it may be pulled off the shafts E, substantially as and for the purpose described.

4. The combination, with the shafts E and the singletree G, of the cuff-like sections F, arranged to slide on the ends of said shafts and provided with buffer-springs $f$ in their socketed ends, adapted to engage the ends of the shafts, the traces connected to said sections F, and locking devices secured to the singletree G, adapted to hold the traces thereto, said springs $f$ adapted to force the sleeves F outward as such locking devices are released, substantially as shown and described.

5. The combination, with the shafts, the singletree G, having apertured ends $g$, journaled thereon, and the traces L, formed with apertured ends $l$, said ends passed through the ends $g$ of the singletree, of the pivoted arms H, formed with depending ends adapted to engage the apertured ends of the traces L and hold them in locked position, a spring-actuated slide-bar, cord or chain connections between said bar and the arms H, and a restraining device on the vehicle, adapted to hold the slide-bar against the tension of the spring, said slide-bar adapted when released to draw upon the cord or chains and release the arms H from the traces, substantially as and for the purpose described.

6. The combination, with the singletree, the traces, and the pivoted locking-arms H for holding said traces to the singletree G, of the running-gear, the band-brakes S, the brake-levers Q, connected therewith, the cross-bar $m'$, the longitudinal spring-actuated bar M, connected with bar $m'$ and formed with a locking-notch $m$, the detent O, arranged to engage said notch, a flexible connection between said rod M and the locking-arms H, whereby said arms are released as the rod M is released from the detent, and the shaft-support T, all arranged substantially as and for the purpose described.

7. The combination, with the thills of a vehicle, of sleeves to which the harness is adapted to be connected, fitted loosely on the thills and springs in the sleeves and bearing against the ends of the thills, substantially as described.

ANNIE H. CHILTON.

Witnesses:
SOLON C. KEMON,
CHAS. A. PETTIT.